Jan. 26, 1965   W. R. HALL   3,167,435
FILTERING SYSTEMS
Filed June 16, 1959   2 Sheets-Sheet 2
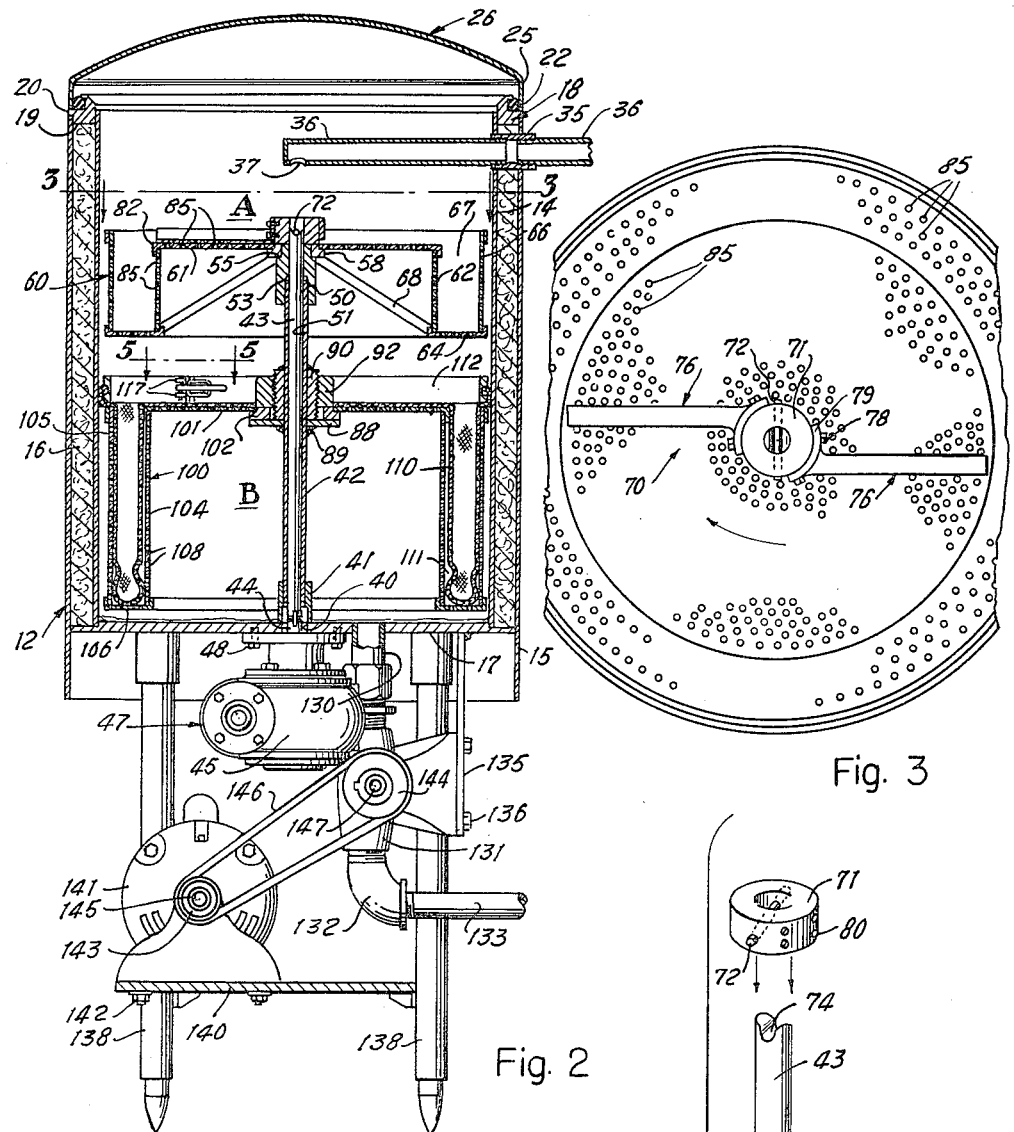
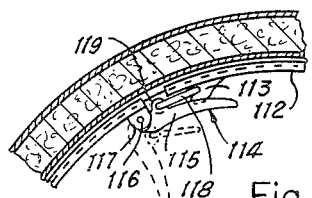
INVENTOR
William R. Hall
BY *Hastings Ackley*
ATTORNEY 3,167,435
FILTERING SYSTEMS
William R. Hall, 2416 Colcord, Waco, Tex.
Filed June 16, 1959, Ser. No. 820,791
5 Claims. (Cl. 99—118)

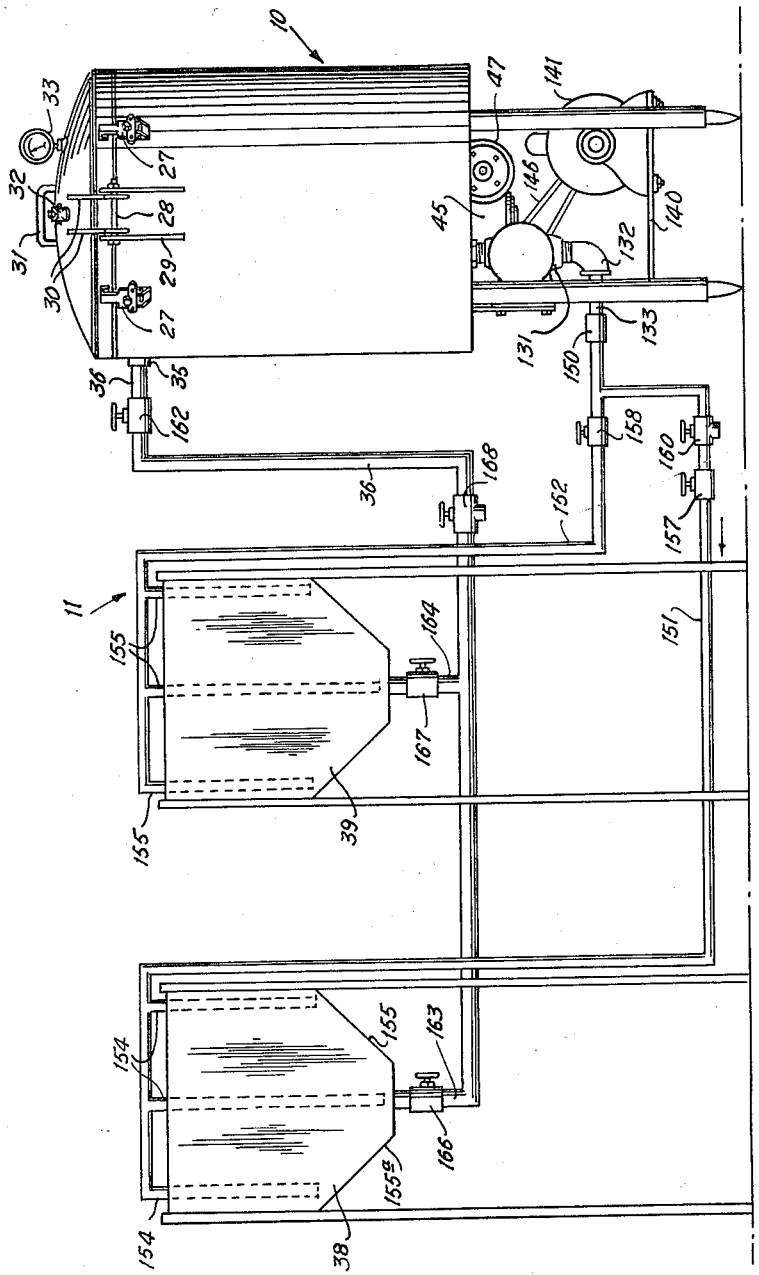

This invention relates to filtering systems, to filters used in connection therewith and to methods for filtering fluids, and more particularly to filtering systems, filters, and methods of filtering used to remove impurities from cooking liquids, such as fats, oils and greases, utilized with cooking apparatus.

This invention is a continuation in part of the co-pending application, Serial No. 707,178, filed January 6, 1958, now U.S. Patent No. 3,100,747.

An object of the invention is to provide a new and improved system for filtering extraneous impurities or matter from cooking liquids.

Another object of the invention is to provide a filtering system for circulating cooking liquids from a kettle to a filter and back to the kettle while the kettle is in operation.

Still another object of the invention is to provide a filtering system for circulating cooking liquids between a plurality of kettles and a filter and back to the kettle while the kettles are in operation.

A further object of the invention is to provide a filtering system for circulating cooking liquids between a deep fat fryer and a filter which permits the cooking liquids to be evacuated from the deep fryer kettle into the filter for storage therein to permit cleaning of the fryer kettle.

A still further object of the invention is to provide a filtering system for circulating cooking liquids between a plurality of deep fryer kettles and a filter which permits evacuation of the cooking liquids from a selected deep fryer kettle into the filter for storage therein while the selected fryer kettle is cleaned.

Another object is to provide a filtering system for circulating cooking liquids between a deep fryer kettle and a filter which permits rinsing or flushing of the fryer kettle by filtered cooking liquids while the kettle is maintained substantially free of such liquids by storing in the filter a major portion of the cooking liquids otherwise held in the fryer kettle.

Still another object of the invention is to provide a new and improved filter for cooking liquids having a separator for separating large solid particles from the cooking liquids and a fine screen means for filtering fine particles from the cooking liquids.

A further object is to provide a filter wherein the screen means has a very large surface area whereby a maximum number of perforations are made available for the passage of liquids through the screen means.

A still further object of the invention is to provide a new and improved filtering system for separating from the cooking liquids fluids released from the foods being cooked during the cooking process.

A still further object of the invention is to provide a filter for separating fluids from the cooking liquids, by vaporization, by drawing the liquids while at the same temperature into an area of lower pressure whereby the fluids which vaporize at a higher pressure are separated from the cooking liquids.

Another object of the invention is to provide a filter for separating extraneous liquids which change to a gaseous state at lower pressures than the cooking liquids by drawing both liquids simultaneously into an area of decreased pressure from an area of higher pressure in extremely small droplets whereby the change of state of the extraneous fluids is facilitated and a separation of the cooking liquids from the extraneous fluids is achieved by withdrawing the cooking liquids from the area of decreased pressure and leaving the extraneous fluids in a gaseous state in such area.

Still another object of the invention is to provide a filter having a chamber divided into two compartments by a means provided with a plurality of fine perforations, one of the chambers being connected to a pump means for reducing the pressure therein and the other chamber having means for introducing a cooking liquid having extraneous liquids, the liquids covering the screen means whereby the pressure in the chamber connected to the pump means is maintained at a lower pressure than the chamber into which the liquids are delivered.

A further object of the invention is to provide a filter having a chamber divided into two compartments by a screen means provided with a plurality of fine perforations, one of the chambers being connected to a pump means for reducing the pressure therein and the other chamber having means for introducing a cooking liquid having extraneous liquids, the liquids covering the screen means whereby the pressure chamber connected to the pump means is maintained at a lower pressure than the chamber into which the liquids are delivered wherein a separator means is disposed in the upper chamber for separating large particles of food from the fluids prior to their passage toward the screen means.

Another object is to provide a filter having a separator wherein the separator means holds the separated large particles substantially out of contact with the cooking liquids flowing through the filter whereby the cooking of such particles is precluded.

Still another object of the invention is to provide a filter having a means for closing the delivery or inlet means of the filter whereby the pressure in the tank may be reduced to a predetermined value in order to permit the atmospheric pressure to force all of the fluid from a deep fryer kettle into the filter when the valve means is opened.

A further object of the invention is to provide a new and improved method for separating or filtering extraneous fluids from cooking liquids.

A still further object is to provide a method for separating extraneous fluids from liquids which includes the steps of reducing the pressure to which the cooking liquids and the extraneous fluids are subjected below the value at which the extraneous fluids pass from the liquid state to the gaseous state but above the value at which the cooking liquids pass from the liquid state to the gaseous state, and withdrawing the cooking liquids while leaving the extraneous fluids in their gaseous state.

Another object is to provide a method for separating extraneous fluids from cooking liquids which includes providing a pair of chambers separated by a fine screen means and decreasing the pressure in one of the chambers while permitting flow of the fluids into the other chamber to cover the screen means whereby the pressure in the one chamber is maintained at a lower value than in the other chamber and the fluid and liquids pass through the fine screen means into the one chamber wherein the extraneous fluids pass from the liquid state into a gaseous state and are thus separated from the cooking liquids.

Still another object is to provide a new and improved method of withdrawing cooking liquids from a fryer kettle into a storage container by reducing the pressure of the storage container and then connecting the storage container to the fryer kettle.

Additional objects and advantages of the invention will be readily apparent from the reading of the following description of a device constructed in accordance with the invention, and reference to the accompanying drawings thereof, wherein:

FIGURE 1 is a side view of a filtering system for filtering the cooking liquids of a plurality of deep fryer kettles;

FIGURE 2 is a vertical sectional view of the filter of the system illustrated in FIGURE 1;

FIGURE 3 is a cross-sectional view taken on line 3—3 of FIGURE 2;

FIGURE 4 is a fragmentary exploded perspective view of two of the operative elements of the filter illustrated in FIGURE 2; and, FIGURE 5 is a fragmentary horizontal sectional view taken on line 5—5 of FIGURE 2.

Referring now to the drawings, the filter 10 of the filter system 11 includes a container 12 having an inner cylindrical wall 14 spaced inwardly of the outer cylindrical wall 15 so that a heat insulating material substance 16 may be disposed therebetween. The bottom wall 17 of the container 12 extends below the lower end of the inner wall which rests thereon and is hermetically sealed to the inner cylindrical wall in a suitable manner, as by welding. The outer wall extends downwardly below the bottom wall and abuts its annular peripheral edge. The outer wall is secured to the bottom wall in any suitable manner, such as welding. A top ring 18 has a lower flange which extends between the inner and outer walls and an external annular flange 20 whose lower annular surface rests upon the upper end of the outer wall. The upper portions of the inner wall telescope upwardly in the top ring and are secured thereto in any suitable manner, as by welding. The top ring is provided with an external annular recess in which is disposed a seal means, such as the resilient ring 22, adapted to abut the internal surface of the annular wall 25 of the cover 26 and to be supported by the annular flange 20 of the top ring.

The cover may be movably secured in hermetically sealed position by any suitable latches 27. The cover may be pivotally connected to the container by means of a hinge pin 28 which extends through aligned apertures in the outwardly extending container brackets 29 and in the outwardly extending cover brackets 30. The cover may also be provided with a handle 31, an air valve 32 through which air may be selectively admitted into the container and a gauge 33 for indicating the pressure within the container.

An inlet fitting 35 extends through the inner and outer walls of the container below the top ring 18 and an inlet extension pipe 36 is threaded into inner end thereof. The inlet extension pipe 36 is provided with a downwardly opening outlet 37. The other end of the inlet fitting has connected thereto a conduit 36 through which cooking liquids from the deep fryer kettles 38 and 39 may flow into the container. The threaded connection between the outer end of the inlet fitting 35 and the conduit 36 is hermetically sealed either by a very close fit or by the use of a suitable compound or substance between the threads. The inlet fitting itself may be welded to the walls so as to hermetically seal the apertures in the wall through which the inlet fitting extends.

The bottom wall 17 of the container has a substantially central aperture 40 about which extends an internal collar 41 secured to the bottom wall in any suitable manner, as by a weld. A support sleeve 42 extends upwardly from the collar having a lower portion telescoped therein and secured thereto by any suitable means, such as a weld. A wiper blade shaft 43 extends through the support sleeve and has its lower end connected to the drive shaft 44 of a speed reducing transmission 45 driven by an electric motor 47. The assembly of the transmission and electric motor is secured to the bottom plate in any suitable manner, as by the screws 48. The upper end of the support sleeve is provided with a support block 50 having a central bore 51 through which the shaft 43 extends. The lower portion of the bore 51 is progressively enlarged to provide a pair of downwardly facing annular shoulders, the lower of the two shoulders engaging the upper end of the support sleeve to limit downward movement of the support block 50 thereon. An O-ring or other suitable seal means 53 is disposed in the bore of the support block between the upper shoulder of the support block and the upper end of the sleeve and between the support block and the blade shaft 43 in order to provide a fluid-tight seal between the sleeve and the rotatable blade shaft which extends therethrough. The support block frictionally engages the support sleeve to prevent its rotation relative thereto. The support block has a reduced portion to provide an upwardly facing shoulder 55 on which rests an inner ring 58 of the separator 60.

The separator 60 includes an annular receiving plate 61 having a central aperture whereby the receiving plate may be positioned over the inner ring 58 to rest upon its upwardly facing shoulder and be rigidly secured to the inner ring by a weld. The receiving plate is provided with a downwardly extending annular peripheral flange which telescopes over the upper portions of an annular inner wall 62 whose lower edge portions are received in an annular channel-shaped annular bottom wall 64. The separator also includes an outer annular wall 66 spaced outwardly from the inner wall and also having its lower edge portions received in the channel bottom wall 64. It will be apparent that the inner, outer and bottom walls form an annular trough 67 in which particles falling off the receiving plate may be received and stored. The inner wall 62 is of lesser height than the outer wall. The walls of the separator are rigidly secured together in any suitable manner, as by welding. Bracing members 68 may extend radially and downwardly from the support block and the inner ring 58 to the bottom wall 64 to which they may be secured by any suitable means, as by welding. It will thus be apparent that the receiving plate, the inner ring, the walls and the support block form a rigid unitary structure which may easily be removed from the container by merely lifting upwardly thereon, the support block being slidably received on the upper end of the support sleeve 42.

A wiper blade assembly 70 is removably positionable over the receiving plate to cause any particles which fall on the receiving plate to be moved outwardly and fall over the outer edges of the receiving plate into the trough 67 of the separator. The wiper blade assembly includes a hub 71 having a pin 72 extending transversely therethrough whose inner portion is receivable in the upwardly opening transverse slot 74 in the upper end of the blade shaft 43. It will be apparent that when the hub 71 is telescoped over the upper end of the blade shaft, the transverse pin moves into the slot 74 whereby the hub is rotated with the shaft.

A pair of wiper blades 76 are rigidly secured to the hub by means of the screws 78 which extend through suitable apertures in the arcuate base portions 79 of the wiper blades into suitable threaded bores 80 of the hub. Each of the wiper blade arms 76 is provided along its lower edge with a layer of felt 82, or other suitable substance, which yieldably engages the top surface of the receiving plate.

The receiving plate and the walls of the separator are formed of expanded or perforated metal so that these elements are provided with apertures 85 through which the liquids discharged through the outlet opening 37 of the inlet pipe extension 36 may flow. Since the outlet opening 37 of the inlet pipe extension 36 is positioned over the center of the receiver plate, the liquids discharged therethrough fall upon the receiving plate and tend to flow downwardly through the perforations 85 of the receiving plate toward the bottom of the container without ever flowing outwardly over the peripheral edges of the receiving plate into the trough of the separator. Any particles of food or other substance which may have been carried with the cooking liquids from the deep fryer kettles 38 and 39 which are too big to pass through the aperture perforations 85 are moved outwardly by the wiper blades and over the peripheral edges of the receiving plate to the trough. Such particles are therefore kept out of the stream of flow of the cooking liquids when they are in the trough and their cooking is stopped when they fall into the trough of the separator. The inner, outer and bottom walls of the separator are also provided with the perforations or apertures 85 in order that any cooking liquids which drain off such particles in the trough may flow downwardly therethrough to the bottom of the container.

The support sleeve is provided intermediate its end with a circular support plate 88 rigidly secured to the sleeve by any suitable means, as by the weld 89. A collar 90 whose lower end abuts the upper surface of the support plate is also rigidly secured to the support sleeve, as by welding, and is exteriorly threaded to receive the nut 92. A divider 100 is supported on the support plate in spaced relation to the bottom wall 16 of the container.

The divider 100 includes an annular horizontal top wall 101 having a reinforcing ring 102 rigidly secured by any suitable means as by welding, to its inner edge portions. The reinforcing ring is adapted to be disposed upon the support plate 88 and be engaged by the nut 92 when the latter is threaded on the collar 90 of the sleeve to hold the divider immovable on the support sleeve 42. The divider also includes an inner wall 104 extending downwardly from the outer periphery of the top wall 101 whose peripheral dependent annular flange telescopes over the inner wall, an outer wall 105 spaced outwardly of the inner wall and a bottom wall 106 of substantially channel shape whose flanges extend upwardly of the lower portions of the inner and outer walls. The walls of the divider are secured to one another in any suitable manner, as by welding, and are provided with perforations or apertures 108.

A flexible screen 110 extends over the divider and into the trough 111 defined by the inner, outer and bottom walls and overlies the top horizontal wall 101 having an annular recess through which the nut 92 may extend. The screen means may be made of a suitable fabric which is of such close weave as to provide approximately 2500 perforations per square inch, the perforations being approximately five microns in diameter. The outer annular edges of the screen means are held against the inner wall of the container by means of a split expander ring 112, one of whose ends is provided with a lug 113 and the other with an expander 114. The expander 114 includes a lever 115 one of whose ends is pivotally secured to the end of the ring opposite the lug 113 by a pin 116 which extends through suitable aligned apertures in the lever and in the lugs 117 of the expander ring. A link 118 has one end pivotally extending through the angular extensions 119 of the lever intermediate the ends thereof. The end of the link 118 opposite the angular extensions of the handle is adapted to engage the lug 113 of the split ring when the lever 115 is pivoted in a counter-clockwise direction, as seen in FIGURE 5, to move the adjacent free ends of the split ring farther apart and thus cause the ring to press the outer edges of the screen 110 into close immovable engagement with the inner wall of the container, the lever 115 being held in such close position when the end of the link 118 in the lugs 119 of the handle 115 moves outwardly out of alignment with the lug 113 and the pin 116. When the lever 115 is rotated in a clockwise direction to the broken line position indicated in FIGURE 5, the ends of the ring are freed to move toward each other and thus permit the removal of the ring and of the screen 110 out of the container.

The divider provides support for the screen 110, which is of course flexible, and the provision of the trough 111 provides for the use of a large area of the screen since the cooking liquids may flow through all portions of the screen and thence outwardly through the inner, outer and bottom walls of the divider as well as through the perforations of the top horizontal wall 101 thereof. It will be apparent that the screen may be removed after the separator 60 has been removed and that the divider may be removed after the screen has been removed by unscrewing the nut 92 from the collar 90 whereupon the ring 102 of the divider is free to move upwardly off the supporting plate and thence upwardly outwardly of the container. The inlet pipe extension 36 of course is unscrewed prior to the removal of either the separator, screen or divider.

The bottom wall 17 of the container is provided with an outlet conduit 130 which extends through a suitable aperture in the bottom wall 17 and is secured thereto in any suitable means, as by welding. The inlet of a pump 131 is connected to the outlet conduit 130 of the container and its outlet is connected through the elbow conduit 132 to the conduit 133. The pump is secured to a vertical support bracket 135 by bolts 136. The support bracket is secured to the bottom wall in any suitable manner, as by welding.

The container is supported on a plurality of legs 138 secured to the bottom wall and a support platform 140 is secured to the legs below the bottom wall in any suitable means, as by welding. The electric motor 141 is mounted on the base in any suitable manner, as by the bolts 142, and is connected to the rotatable shaft 143 of the pump 131 by means of the belt 146 and the pulleys 143 and 144 rigidly secured to the drive shaft 145 of the motor and the shaft 147 of the pump, respectively. It will be apparent that when the electric motor 141 is energized the pump is actuated to draw fluids from the container and deliver them to the conduit 133. The pump is of the type which will pump either gases or liquids.

It will be apparent that the divider and the screen 110 divide the interior of the container 12 into an upper delivery chamber A and a lower chamber B. As will be explained below, when the pump is operating, the pressure in the chamber B will be less than the pressure in the upper delivery chamber A whereby such pressure differential will cause the fluids to tend to flow from the upper chamber into the lower chamber through the perforations of the screen and through the apertures 108 of the divider. The outlet conduit of the pump 133 and of the pump 131 is provided with a check valve 150 which prevents reverse flow of fluids to the pump.

The outlet conduit 133 is provided with outlet branch conduits 151 and 152. The branch conduit 151 extends over the upper end of the deep fry kettle 38 and has downwardly dependent extensions 154 which extend into the deep fryer kettle to discharge liquids adjacent the inclined heating surfaces 155 of the deep fryer kettle and the bottom thereof, as is more fully explained in my co-pending application. The outlet branch conduit 152 is provided with similar downwardly extending extensions 155 which discharge the liquids adjacent the heating surfaces of the deep fryer kettle 39. Suitable heating means, not shown, are disposed adjacent the heating surfaces of the deep fryer kettles to heat the cooking liquids. The outlet branch conduits 151 and 152 are provided with valves 157 and 158, respectively, so that the fluid being delivered by the pump may be directed selectively through either or both of the outlet branch conduits. A suitable drain valve 160 may be connected in the outlet branch conduit 151 to permit draining of the cooking fluids from both the filter and the deep fryer kettles if this be desired.

The inlet conduit 36 is provided with a control valve 162 whereby flow of fluids into the container may be controlled or completely shut off as desired. The inlet fitting 35 of the container connects with the outlet conduits 163 and 164 of the deep fryer kettles 38 and 39, respectively. The outlet conduits 163 and 164 of the deep fryer kettles 38 and 39 are provided with valves 166 and 167, respectively. The inlet conduit 36 is provided with a drain valve 168.

The inlet fitting 35 of the container 12 is disposed above the upper ends of the deep fryer kettles so that cooking liquids will not flow into the upper chamber A from the inlet duct 36 by gravity and can be drawn into the upper chamber only when the pump 32 is in operation.

It will be apparent that if the control valve 162, the outlet conduit valves 166 and 167 of the deep fryer kettles, and the valves 157 and 158 of the outlet branch conduits 151 and 152 are open and the valve 32 of the container cover 26 is closed, energization of the motor 141 will cause the pump to circulate the cooking liquids from the lower ends of the deep fryer kettles into the upper chamber A of the container, through the perforations 85 of the separator 60, the perforations of the screen 110, and the apertures 108 of the divider into the lower chamber B of the container, thence through the outlet pipe 130 to the pump and from the pump outlet conduit 133 through the outlet branch conduits 151 and 152 back into the deep fryer kettles 38 and 39 through their extensions 154 and 155, respectively.

During such circulation of the cooking liquids, which are oils, fats or greases, any particles of food which are too big to fall through the perforations 85 of the receiving plate 61 of the separator are moved radially outwardly on the receiving plate by the wiper blades 76 and fall into the trough of the separator to be retained therein when the motor 47 is energized. The wiper blades also tend to break down the surface tension of any droplets of cooking liquids which otherwise might tend to roll outwardly off the receiving plate rather than flow through the perforations of the receiving plate. Substantially all of the cooking liquids discharged through the outlet 37 of the inlet extension pipe 36 flow through the perforations 85 of the receiving plate and fall onto the screen means 110 to form a layer of liquid over the screen means and over the top wall 101 of the divider to a depth of approximately an inch as the cooking liquids are circulated constantly through the container. The cooking liquids are drawn through the very small perforations of the screen and then through the perforations 108 in the inner, outer and bottom walls of the divider to fall down on the bottom wall 17 of the container and then flow into the inlet conduit 130. Food particles or debris cannot of course pass through the very small apertures of the screen 110 so that the liquids which flow into the chamber B of the container are free of solid particles.

The foods which are cooked in the deep fryer kettles 38 and 39 may emit or release juices or fluids into the cooking liquids. It is found that such extraneous fluids may give unwanted odors or taste to the cooking liquids, such tastes then being imparted to any other foods which may thereafter be cooked in such cooking liquids. It is therefore desirable that such extraneous fluids be removed from the cooking fluids in the filter. Such extraneous fluids pass from their liquid state to a gaseous state at a lower pressure than that required to cause the cooking liquids to pass from their liquid state to their gaseous state at the same temperature. It is found that such extraneous fluids at the ordinary temperatures of the cooking liquids, in the range of 350 to 400 degrees Fahrenheit, will pass from the liquid state to gaseous state when the pressure to which they are subjected is decreased to 15 to 25 inches of mercury. During the operation of the filter, therefore, the pump and control valve 162 are so regulated that the pressure in the upper chamber A is maintained at 25 to 27 inches of mercury while the pressure in the lower chamber B is maintained at 15 to 25 inches of mercury. This differential in pressure between the two chambers is effected by the screen means and augmented by the layer of liquid over the screen means. As a result, the fine droplets of cooking fluids, in which such other extraneous fluids are either dissolved or emulsified, upon passing through the perforations of the screen are suddenly subjected to a decreased pressure, while their temperatures remain substantially the same, and the extraneous fluids pass to their gaseous states and remain in their gaseous state in chamber B since sufficient liquid flows through the screen at all times to keep the bottom wall 17 of the container covered with a layer of filtered cooking liquids. The pump thus pumps only the cooking liquids, an adequate supply being delivered at all times to keep the outlet conduit 130 thereof constantly filled with such cooking liquids. As a result, the cooking liquids which are drawn from the container are free not only of solid extraneous particles but are also free of any extraneous fluids. When the operation of the pump is stopped and the pressure in the container and the chamber B is allowed to rise, such extraneous fluids of course revert back to their liquid state and may be drawn off, the pump being shut prior to the complete withdrawal of oil from the container so that such extraneous fluids are not pumped back into the deep fryer kettles. These liquids may then be drained off by closing the valves 157, 158, 167 and 166, opening the drain valve 160 and again starting operation of the pump 131.

It will be apparent that either or both kettles 38 and 39 may be connected to the filter 10 in order that the cooking liquids thereof be circulated and filtered to remove both extraneous solid particles or debris and extraneous fluids as explained above. For example, if only the kettle 39 is in operation, the valve 166 and the valve 157 are closed while the valves 158, 167 and 162 are opened. As a result, the pump 131 pumps the cooking liquids from the deep fryer kettle 39 through the open valve 167, the conduit 36, the open valve 162 and the inlet fitting 35 into the upper delivery compartment A of the filter container 10 and then down through the lower compartment B through the pump to the outlet conduit 133, through the open valve 158 and the branch outlet conduits 152 back into the kettle. During such circulatory movement through the filter 10, extraneous particles or extraneous fluids are separated from the cooking fluids. If both kettles are being used simultaneously then the valves 166 and 157 are also open whereby the cooking fluids are simultaneously circulated from both the deep fryer kettles 38 and 39 through the conduit 36 to the filter 10 and back to the kettles through the branch outlet conduits 152 and their open valves 157 and 153. The drain valves 168 and 160, of course, are kept closed during normal operation of the filter.

Should it now become desirable to empty one of the deep fryer kettles; for example, the deep fryer kettle 39 in order that the kettle may be cleaned by scraping or wiping, which operation is not possible when the kettle is filled with cooking liquids, the valves 166 and 157 are closed in order that the operation of the deep fryer kettle 38 not be disturbed. As a result of the closing of the valves 166 and 157 which control entry or egress of cooking fluids from the deep fryer kettle 38, no circulation of liquids to or from the deep fryer kettle can now take place. The control valve 162 is then closed. The valve 32 of course is also closed. The pump removes all cooking fluids from the container 10 and into the deep fryer kettle 39 and once all cooking liquids have been removed from the container 10 continued operation of the pump creates a vacuum until the pressure within the container drops to 15 to 20 inches of mercury. The pump is stopped by de-energizing its electric motor 141 by suitable switch means, not shown. At this time, if desired, although this is not necessary, the motor 47 is energized to cause the wiper blade shaft 43 to rotate. The condition of reduced pressure within the tank of course is maintained due to the action of the check valve 150 which prevents flow of fluids into the container through the conduit 133. The control valve 162 is then gradually opened and the atmospheric pressure then forces all of the oil from the deep fryer kettle 39 to flow into the container 10 since the pressure within the container is reduced. Since the pump is not operating at this time, the cooking liquids are retained in the container, the pump preventing the flow of the liquids therethrough since it is not operating. If desired, the valve 158 may also be closed at the same time the operation of the pump is stopped to ensure that the cooking liquid not flow out of the container.

The cooking liquids which are thus drawn from the deep fryer kettle 39 are discharged onto the receiving plate of the separator 60 and if the wiper blade is rotating the large particles or debris are moved into the trough 67 of the separator. In the event the wiper blades are not rotating such particles accumulate on the receiving plate but since the rate of flow of the cooking liquids is gradual due to the gradual opening of the control valve 62, such particles or debris may remain on the receiving plate while the cooking liquids flow slowly through the apertures of the receiving plate.

When all of the cooking liquids from the deep fryer kettle 39 have been drawn into the container 10, the walls and bottom of the deep fryer kettle may be cleaned by any means necessary such as wiping and scraping. When the cleaning of the deep fryer kettle is completed, it may be flushed with filtered cooking liquids from the filter 10 by again energizing the pump motor 141 and opening the valve 162 and, if the valve 158 had been previously closed, also opening the valve 158. As a result, filtered cooking liquids are moved through the outlet branch conduits 155 into the now empty deep fryer kettle 39 thus flushing or rinsing the kettle. The cooking liquids are not allowed to build up or accumulate in the fryer kettle since as soon as the cooking liquids are delivered to the deep fryer kettle they are immediately withdrawn back into the filter 10, the bulk or major portion of the cooking liquids now being maintained in the container.

When the rinsing of the deep fryer kettle 39 is completed and it is then desired to remove all cooking liquids from the deep fryer kettle 38 in order that cleaning or other operations may be performed thereon, the control valve 162 is again closed while the pump is allowed to continue to operate so that all of the liquid from the container 12 of the filter 10 is pumped into the kettle 39 and a condition of low pressure is again created within the container 12. When all the cooking liquids are returned to the deep fryer kettle 39, the valve 167 and the valve 158 are closed, and the operation of the pump is stopped. Opening the valve 166 of the deep fryer kettle 38 and the control valve 162 will then cause the atmospheric pressure to move all of the cooking liquids contained in the deep fryer kettle 38 into the container 12 of the filter due to the reduced pressure existing therein. The deep fryer kettle 38 in turn may then be cleaned or have other operations performed thereon and then be subjected to a rinsing operation with the filtered cooking liquids in the same manner as described above in connection with the rinsing of the deep fryer kettle 39.

When it is desired to move the cooking liquids back into the deep fryer kettle 38, the pump 131 is again operated and the valve 32 is opened. Since the valve 32 is opened there is no decrease of pressure within the container 12 and therefore no withdrawal of the cooking liquids from the deep fryer kettle 38 takes place even if the valve 166 is open as the pump moves the cooking liquids from the filter container 12 to the deep fryer kettle 38.

When the cooking liquids have been returned to the deep fryer kettle 38, the valve 32 may again be closed and the outlet valves 166 and 167 of the deep fryer kettle and the inlet valves 157 and 158 again opened to permit circulation of the cooking liquids through both the deep fryer kettles and through the filter.

If it is desired to empty a deep fryer kettle, such as deep fryer kettle 39, of all cooking liquids and at the same time rinse or flush the kettle with filtered cooking liquids, the outlet valve 166 and the inlet valve 157 of the deep fryer kettle 38 are closed so that it no longer is connected to the filter 10. The control valve 162 is then closed in order that the pressure within the container be decreased to fifteen to twenty inches of mercury whereupon the control valve 162 is opened while the pump is permitted to continue operating. As a result, the cooking liquids from the deep fryer kettle 39 are withdrawn from the kettle through the inlet conduit 36 at a faster rate than they are being delivered by the pump through the outlet branch conduit 152. The level of the cooking liquids in the deep fryer kettle 39 will therefore drop until the kettle is drained of all cooking liquids except that which are being returned by the pump. Since the returned cooking liquids are being immediately withdrawn from the deep fryer kettle into the filter container 12, the continuous flow of such filtered cooking liquids rinses the deep fryer surfaces 55 and the bottom. This rinsing or flushing operation may be continued as long as necessary. When the rinsing operation is to be stopped, the control valve 162 may be closed if the other deep fryer kettle 38 is to be rinsed or if no other deep fryer kettles are to be rinsed the relief valve 32 is again opened until all the cooking liquids from the last kettle being rinsed are returned back to the deep fryer kettle. The various valves may then be again opened while the valve 32 is closed to permit normal circulation of the cooking liquid between the deep fryer kettles and the filter.

If the filtering system is to be rendered inoperative or placed out of use for an appreciable length of time, it may be necessary to drain the filter system together with all outlet and inlet branches if the cooking liquids which are in use congeal at ordinary room temperatures in order to prevent their congealing in the inlet and outlet conduits and in the filter and thus preventing restarting of the operation of the filter system. In order to drain the inlet conduit 36 while maintaining the cooking liquids in the filter tanks 38 and 39, the outlet valves 166 and 167 are closed and the drain valve 168 is then opened. Since the cooking liquids are still warm, they will drain from the conduit 36 into any suitable receptacle placed below the drain valve 168. After this is accomplished, the drain valve 160 is opened to permit flow of any liquids in the outlet branch conduits 151 and 152 through the drain valve 160 into any suitable receptacle. The valves 158 and 157 are then closed, the valve 32 is opened and the pump is again operated until all of the cooking liquids in the filter container 12 and in the pump have been expelled by the pump through the drain valve 160.

It will now be seen that a new and improved method for withdrawing cooking liquids from a deep fryer kettle has been illustrated and described which includes the steps of evacuating a closed filter container 12 until a predetermined low pressure is attained within the container and then connecting the interior of the container to the bottom of the deep fryer kettle whereby atmospheric pressure forces the cooking liquids from the container into the closed container to be retained thereby while the deep fryer kettle is subjected to such operations as cleaning, scraping or repair.

It will further be seen that a new and improved method has been described for operating a filtering system including a filter container, a kettle, a first conduit means connecting the upper end of the filter container with the lower end of the kettle, a second conduit means connecting the lower end of the filter container with the interior of the kettle, and a pump means for pumping fluids from the filter container through the second conduit means which includes closing the first conduit while the pump means is operating to reduce the pressure within the container and opening the first conduit to cause the fluids in the kettle to be moved into the filter container for storage therein.

It will further be seen that the method includes stopping the operation of the pump means at the time of opening of first conduit means whereby the pump does not immediately remove the fluids from the filter container when they are delivered thereto.

It will further be seen that a new method for flushing or rinsing a receptacle or kettle has been illustrated and described which includes closing the first conduit means, operating the pump to reduce the pressure within the container to a predetermined value, and then opening the first conduit means to permit substantially all the fluids from the receptacle to move into the filter container while the pump continues to operate to cause liquid drawn from the filter container to be moved into the receptacle to flush the latter, the rate of flow of the liquid into the container exceeding the rate of flow of the liquid from the filter container until the major portion of the liquid is stored in the filter container and the rates of flow of liquid into and from the receptacle are equal.

It will further be seen that a new and improved method for separating extraneous fluids from cooking liquids has been illustrated and described which includes atomizing the cooking liquids together with the extraneous fluids into small droplets by passing the extraneous fluids and cooking liquids through a screen means, decreasing the pressure to which the droplets are subjected below the value at which the extraneous fluids vaporize or pass to a gaseous state but above the pressure at which the cooking liquids vaporize or pass to a gaseous state, and drawing off the cooking liquids while the extraneous fluids are maintained in a gaseous state.

It will further be seen that a new and improved filter has been illustrated and described which includes a separator onto which cooking liquids containing extraneous fluids and extraneous or foreign particles are discharged, the separator retaining the extraneous particles and permitting the liquids and the fluids to pass therethrough to a divider and screen which causes separation of the extraneous fluids and fine particles from the cooking liquids.

It will further be seen that a filter system provides for the storage of liquid in a filter container when other operations must be performed on the kettle which require that it be emptied of the liquids obviating the need for diverting the liquid from the filter container into separate storage receptacles.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A method for separating extraneous fluids from cooking liquids including: heating cooking liquids containing extraneous fluids to a temperature of between 350 and 400 degrees Fahrenheit; continuously delivering the fluids and liquids into an upper compartment of a closed chamber provided with a screen means having a plurality of perforations and dividing the chamber into an upper compartment and a lower compartment; maintaining the pressure in the upper compartment at twenty-five to twenty-seven inches of mercury; reducing the pressure in the lower compartment to a predetermined value of between fifteen to twenty-five inches of mercury and lower than the pressure in the upper compartment to cause the fluids and liquids to be drawn from the upper compartment into the lower compartment in an atomized condition, said predetermined value being below the value of pressure at which said extraneous fluids pass from their liquid state to their gaseous state and above the value at which said cooking liquids pass from their liquid state to said gaseous state whereby the cooking liquids remain liquid while said extraneous fluids pass to their gaseous state; and drawing off said cooking liquids from said lower compartment while retaining said extraneous fluids in their gaseous state in said lower compartment.

2. A filter system for a frying kettle comprising. means providing a closed chamber having an inlet at its upper end and an outlet at its lower end; means for connecting the inlet to the lower portion of the kettle, said connecting means and said inlet being disposed to prevent gravity flow of liquid from said inlet of said chamber to the kettle; pump means connected to the outlet of the chamber for reducing the pressure within the chamber whereby liquid may be drawn from the kettle through the inlet into the chamber, said pump means discharging fluids from the chamber back into the kettle; filter means in the chamber interposed between the inlet and the outlet, said filter means including a screen means dividing said chamber into an upper compartment communicating with said inlet and a lower compartment communicating with said outlet, said screen means providing a plurality of perforations whereby fluids drawn through said perforations are atomized and whereby a pressure differential is created between said compartments when said pump means is operated; and a separator in the upper compartment for separating foreign particles from the liquids drawn through the inlet, said separator including a perforate plate on which said liquids from the inlet are discharged and an outwardly upwardly opening receptacle disposed about said plate for receiving foreign particles deposited on said plate.

3. A filter system for a frying kettle comprising: means providing a closed chamber having an inlet at its upper end and an outlet at its lower end; means for connecting the inlet to the lower portion of the kettle, said connecting means and said inlet being disposed to prevent gravity flow of liquid from said inlet of said chamber to the kettle; pump means connected to the outlet of the chamber for reducing the pressure within the chamber whereby liquid may be drawn from the kettle through the inlet into the chamber, said pump means discharging fluids from the chamber back into the kettle; filter means in the chamber interposed between the inlet and the outlet, said filter means including a screen means dividing said chamber into an upper compartment communicating with said inlet and a lower compartment communicating with said outlet, said screen means providing a plurality of perforations whereby fluids drawn through said perforations are atomized and whereby a pressure differential is created between said compartments when said pump means is operated; a separator in the upper compartment for separating foreign particles from the liquids drawn through the inlet, said separator including a plate on which said liquids from the inlet are discharged and an annular outwardly upwardly opening receptacle disposed about said plate for receiving foreign particles deposited on said plate; and means actuatable for moving foreign particles from said plate to said receptacle.

4. A filter system for a frying kettle comprising: means providing a closed chamber having an inlet at its upper end and an outlet at its lower end; first means for connecting the inlet to the lower portion of the kettle, said connecting means and said inlet being disposed to prevent gravity flow of fluids from said inlet of the chamber to the kettle; pump means connected to the outlet of the chamber for reducing the pressure within the chamber whereby liquid may be drawn from the kettle through the inlet into the chamber, said pump means discharging fluids from the chamber back into the kettle; filter means in the chamber interposed between the inlet and the outlet, said filter means including a screen means dividing said chamber into an upper compartment communicating with said inlet and a lower compartment communicating with said outlet, said screen means providing a plurality of perforations whereby fluids drawn through said perforations are atomized and whereby a pressure differential is created between said compartments when said pump means is operated; and a divider comprising an upper horziontal wall and an upwardly opening annular receptacle connected to said horizontal wall and extending downwardly therefrom, said screen means overlying said horizontal wall and extending into said annular receptacle, said annular receptacle being provided with perforations over substantially all of its surface whereby fluids drawn through said screen may flow through all portions of the receptacle.

5. The filter system of claim 4 and a separator in the upper compartment for separating foreign particles from liquids drawn through the inlet prior to the passage of the liquids to the screen means, said separator including a perforate plate on which said liquids from the inlet are discharged and an outwardly upwardly opening receptacle disposed about said plate for receiving foreign particles deposited on said plate.

References Cited in the file of this patent
UNITED STATES PATENTS

| | | |
|---|---|---|
| 567,210 | Wilson | Sept. 8, 1896 |
| 2,089,702 | Lomax | Aug. 10, 1937 |
| 2,240,167 | Adams | Apr. 29, 1941 |
| 2,540,517 | Glasco | Feb. 6, 1951 |
| 2,575,051 | Egger et al. | Nov. 13, 1951 |
| 2,652,767 | Childs | Sept. 22, 1953 |
| 2,733,815 | Kwochka et al. | Feb. 7, 1956 |
| 2,760,645 | Mies | Aug. 28, 1956 |
| 2,830,041 | Cline | Apr. 8, 1958 |
| 2,851,164 | Morino | Sept. 9, 1958 |
| 2,894,633 | Collins | July 14, 1959 |